US010389213B2

(12) United States Patent
Xiao et al.

(10) Patent No.: US 10,389,213 B2
(45) Date of Patent: Aug. 20, 2019

(54) APPARATUS FOR REDUCED VOLTAGE STRESS ON AC MOTORS AND CABLES

(71) Applicant: Rockwell Automation Technologies, Inc., Mayfield Heights, OH (US)

(72) Inventors: Yuan Xiao, Kitchener (CA); Navid RezA Zargari, Cambridge (CA); Lixiang Wei, Mequon, WI (US); James A. Ulrich, Hartland, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 382 days.

(21) Appl. No.: 15/293,899

(22) Filed: Oct. 14, 2016

(65) Prior Publication Data
US 2018/0083514 A1  Mar. 22, 2018

Related U.S. Application Data

(60) Provisional application No. 62/398,015, filed on Sep. 22, 2016.

(51) Int. Cl.
H02K 11/00 (2016.01)
H02K 11/33 (2016.01)
H02K 11/22 (2016.01)

(52) U.S. Cl.
CPC .......... H02K 11/33 (2016.01); H02K 11/022 (2013.01)

(58) Field of Classification Search
CPC ............................. H02K 11/33; H02K 11/022
USPC ....................................................... 310/68 R
See application file for complete search history.

(56) References Cited

U.S. PATENT DOCUMENTS

| | | | | |
|---|---|---|---|---|
| 3,792,350 A | * | 2/1974 | Bossler | G01R 31/021 324/530 |
| 5,912,813 A | | 6/1999 | Kerkman et al. | |
| 5,990,654 A | | 11/1999 | Skibinski et al. | |
| 2007/0066121 A1 | * | 3/2007 | Arlitt | H01R 4/24 439/404 |
| 2010/0097070 A1 | * | 4/2010 | Crick | G01R 29/0835 324/525 |

(Continued)

OTHER PUBLICATIONS

A.F. Moreira, T.A. Lipo, G. Venkataramanan and S. Bernet, "Modeling and Evaluation of dv/dt Filters for AC Drives with High Switching Speed", 9th European Conference on Power Electronics and Applications, Graz, Austria, Aug. 2001.

(Continued)

*Primary Examiner* — Jianchun Qin
(74) *Attorney, Agent, or Firm* — Fay Sharpe LLP

(57) ABSTRACT

Disclosed examples include apparatus to couple a motor drive to a motor, including a cable with a first end coupled with an output of a motor drive, a second end coupled with a motor, a plurality of conductors to convey an output signal of the motor drive between the first and second ends to drive the motor, and a plurality of shields, with a conductive junction to couple tap points of at least two of the shields together. Resistors can be used to connect the tap points to the conductive junction to provide an impedance in series with the corresponding shield to reduce voltage stress to the motor or the cable. In certain examples, the shields include a semiconductor material to provide an impedance between the first end and the conductive junction to reduce voltage stress to the motor or the cable.

20 Claims, 13 Drawing Sheets

(56) References Cited

U.S. PATENT DOCUMENTS

2014/0143578 A1* 5/2014 Cenizal .................. H02J 13/00
 713/340
2014/0266241 A1* 9/2014 Innes .................. G01R 19/155
 324/537

OTHER PUBLICATIONS

G. Skibinski. "Design Methodology of a Cable Terminator to Reduce Reflected Voltage on AC Motors", Proceedings of 31$^{st}$ IEEE Industry Applications Society Conference (IAS'96), vol. 1, pp. 153-161, San Diego, CA, USA, 1996.

* cited by examiner

APPARATUS FOR REDUCED VOLTAGE STRESS ON AC MOTORS AND CABLES

REFERENCE TO RELATED APPLICATION

The present application claims priority to, and the benefit of, U.S. Provisional Application No. 62/398,015, filed Sep. 22, 2016, the subject matter of which is incorporated herein by reference in its entirety.

BACKGROUND INFORMATION

The subject matter disclosed herein relates to motor drive systems.

BRIEF DESCRIPTION

Disclosed examples include motor drive systems, cables and apparatus to couple a motor drive to a motor, including a cable with a first end coupled with an output of a motor drive, a second end coupled with a motor, a plurality of conductors to convey an output signal of the motor drive between the first and second ends to drive the motor, and a plurality of shields, where the individual shields at least partially surround a corresponding conductor. A conductive junction electrically couples tap points of at least two of the shields together, where the tap points are spaced from the first end. A resistor can be used to connect the tap points to the conductive junction in certain examples to provide an impedance in series with the corresponding shield between the first end and the conductive junction to reduce voltage stress to the motor or the cable. In certain examples, the shields include a semiconductor material to provide an impedance between the first end and the conductive junction to reduce voltage stress to the motor or the cable, where the conductive junction can be integral with the cable. In certain examples, the tap points are proximate the second end, or can be spaced from the second end.

DETAILED DESCRIPTION

Figure 1:
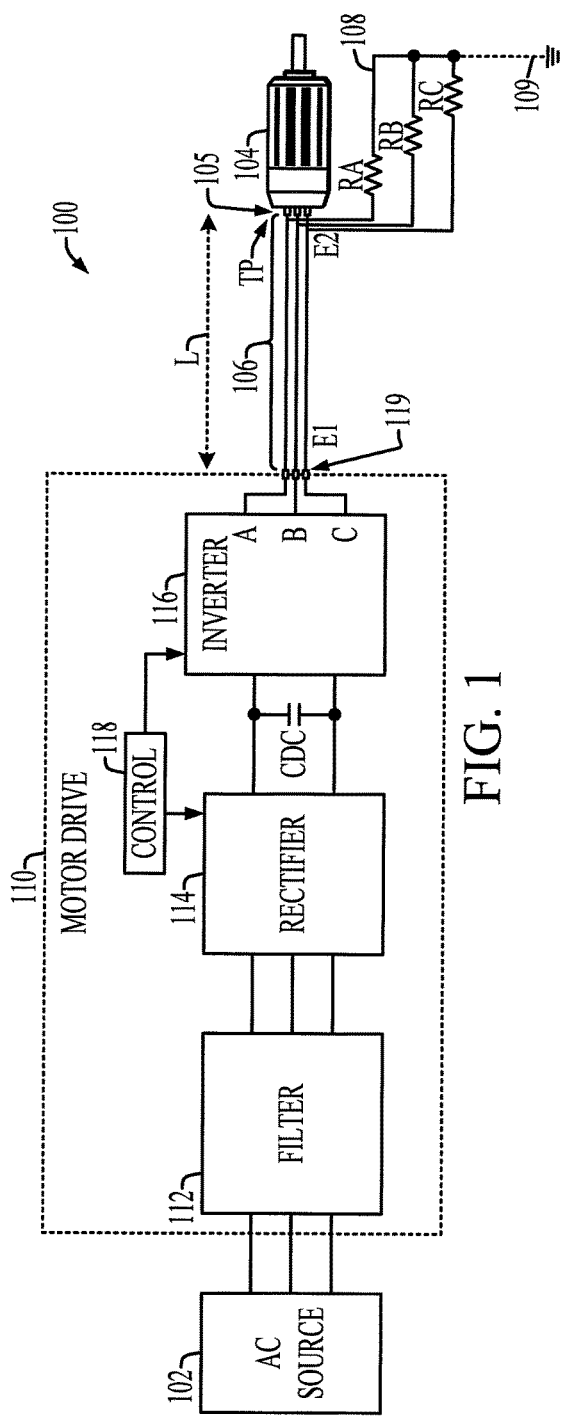
FIG. 1 is a schematic diagram of a motor drive.

FIG. 1 illustrates a motor drive system 100 including a three-phase AC power source 102 and associated lines that provide AC input power to a motor drive power converter 110 to drive a motor load 104. The system 110 in one example includes an isolation transformer or optional three phase input filter circuit 112 that delivers AC power to the input of a three-phase diode rectifier or active front end (AFE) rectifier 114. The rectifier 114 includes an output that provides a DC output signal to an intermediate DC circuit or DC bus connected between the rectifier 114 and the input of an inverter 116. The rectifier 114 and the inverter 116 include switching devices (not shown) operated according to switching control signals from a control circuit 118 to convert input AC power into DC bus voltages or currents in the intermediate circuit, and to convert DC power from the intermediate circuit to generate AC output power. In one example, the DC intermediate circuit includes a capacitor CDC connected between positive and negative DC bus lines DC+ and DC− as shown in FIG. 1. In other examples, a current source converter implementation of the motor drive 110 includes one or more DC link chokes or inductors in the intermediate circuit between the output of the rectifier 114 and the inverter input.

The inverter includes a DC input coupled to the output of the rectifier 114 through the intermediate circuit, and an output coupleable, directly or indirectly, to provide an AC output signal through a cable 106 to drive the motor load 104. In this example, the inverter 116 provides a three-phase output signal to drive the motor 104. In other examples, the inverter can provide a single-phase AC output to drive a corresponding single-phase motor load (not shown). The output of the inverter 116 and the motor load 104 can be directly connected to one another via the cable 106 using inverter output connection terminals or points 119 and motor lead connection terminals or points 105 as shown in FIG. 1. Indirect coupling can be used in other examples, for instance, using an output sinewave filter for other filter circuit connected to the output of the inverter 116, with a cable 106 connected from the output of the filter circuit to the motor terminals 105. In another example, a filter and/or a transformer can be connected between the inverter output and the cable 106.

The disclosed examples provide apparatus to couple the motor drive 110 to the motor 104 to reduce voltage stress to the motor 104 or the cable 106. The cable 106 includes a first end E1 coupled with the output of a motor drive 110 and a second end E2 coupled with the motor 104. The coupling of the first end E1 to the inverter 116 can be direct or indirect (e.g., through a filter and/or a transformer). Also, the coupling of the second cable end E2 to the motor 104 can be direct or indirect. The cable 106 includes a plurality of conductors 120 to convey the single or multiphase output signal of the motor drive 110 between the ends E1 and E2 to drive the motor 104. The cable 106 also includes a corresponding plurality of shields 130. The individual shields 130 at least partially surround a corresponding one of the conductors 120. The disclosed apparatus provides a simple and low cost solution to reduce voltage stress on AC motors and cables in variable frequency drive (VFD) systems without connecting apparatus to live circuits.

The system also includes a conductive junction 108 that electrically couples two or more tap points TP of two or more of the shields 130 together. The tap points TP are spaced from the first end E1. In certain implementations, the shields are connected together at the first end E1, and form a set of parallel circuits between the first end and the junction 108 at tap points TP. The junction 108 and the tap points are proximate the second end E2 in some examples, such as within a few inches of the end E2 as seen in FIG. 1. In other example discussed below, the tap points TP are spaced from the second end E2. The tap point location terminates the shield circuit, and disclosed examples provide supplemented impedance of the shield circuits to reduce the amplitude of reflected waves along the cable 106 and mitigate voltage stress to the motor 104 or the cable 106. In certain examples, the conductive junction 108 is connected to a reference voltage 109 proximate the second end E2, such as a ground reference near the motor load 104 as seen in FIG. 1. In other examples, the conductive junction is floating.

In some embodiments, the tap points TP are directly connected to the conductive junction 108. Any suitable electrical interconnection can be used to electrically connect portions of the shields 130 directly to the conductive junction 108, such as solder connections, mechanical interconnections that form an electrical connection, etc. In other examples, as shown in FIG. 1, a resistor couples at least one of the shields 130 to the junction 108. Any suitable electrical interconnection techniques can be used to connect terminals of the corresponding resistors to the shields 130, and to connect the other terminals of the resistors to one another to form a conductive junction 108. In addition, where used, any suitable electrical connection techniques and apparatus can be used to selectively connect the conductive junction 108 to a reference voltage 109.

The three-phase example of FIG. 1 includes a plurality of resistors RA, RB and RC individually corresponding to one of the plurality of shields 130 associated with corresponding phases A, B and C and a corresponding one of the tap points TP. Each of the resistors RA, RB and RC includes a first terminal connected to the corresponding tap point TP of the corresponding shield 130, and a second terminal connected to the conductive junction 108. The resistors RA, RB and RC to provide an impedance in series with the corresponding shield 130 between the first end E1 and the conductive junction 108 to reduce voltage stress to the motor 104 and/or the cable 106. Any suitable resistance value can be used, which can be set to a value close to or higher than the characteristic impedance of the cable 106. In one example, the individual resistors RA, RB and RC have a resistance about 100-200 ohms for cable lengths L of 1200 to 2400 ft.

Although illustrated examples show three-phase implementations, single-phase or other multiphase embodiments are possible. For example, a single-phase implementation could include a single resistor R connecting shields 130 associated with two conductors 120 within a cable 106 to one another at associated tap points TP. In another possible single-phase implementation, two resistors R are used, each having a first terminal connected to an associated one of two shields 130 in the cable 106, and second terminals of the resistors R are connected to one another at a conductive junction 108. In multi-phase implementations, any suitable number of shields and associated resistances (internal via semiconductor shield materials 130s or external resistances via resistors R) can be used to form a shield network within a cable 106 between the first end E1 and the location of the tap points TP. In addition, the tap points TP are spaced from the first end E1, and can be located either proximate the second end E2 or spaced from E2. Moreover, the resulting conductive junction 108 can form a floating node (e.g., a neutral for multiphase implementations), or the conductive junction 109 can be connected to a reference voltage node 109, such as a ground.

Figure 2:
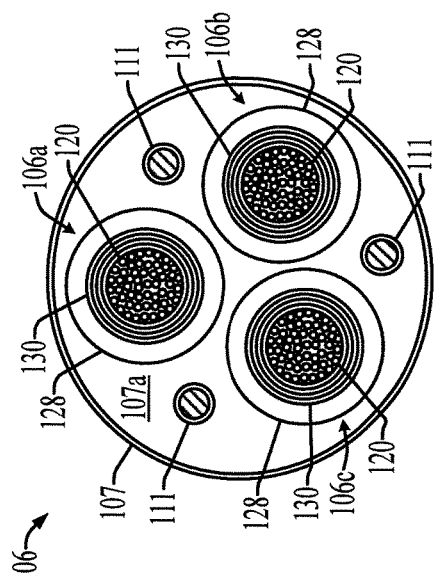
FIG. 2 is an example of cable section view.

FIG. 2 shows an example three-phase cable 106 including three inner cables 106a, 106b and 106c individually corresponding to the inverter output phase lines A, B and C, respectively. The inner cables 106a, 106b and 106c in this example are disposed within an insulation material 107a that is surrounded by an outer sheath or jacket 107. The outer jacket 107 in certain examples can be a multilayer structure, including a black Arctic grade flame retardant oil, abrasion, chemical and sunlight resistant thermosetting compound meeting UL 1309/CSA 245, IEEE 1580 and UL 1072, allowing for isolation between insulation shields and the overall shield, and shields can then be terminated on opposite ends to minimize circulating currents. Outlying the thermosetting compound layer in certain examples is an armor/EMI shield formed of overall tend copper braid plus aluminum/polyester tape providing 100% coverage to serve as both an armor and an EMI shield to meet IEEE 1580 and UL 1307/CSA 245, as well as an optional outer black acrylic grade sheath that is flame retardant, oil, abrasion, chemical and sunlight resistant thermosetting compound meeting UL 1309/CSA 245, IEEE 1580 and UL 1072, where different colored jackets can be used to signify different voltage levels (e.g., orange for 8 kV, red for 15 kV, etc.).

Each individual inter cable 106a, 106b and 106c includes a conductor 120 and a shield 130 surrounded by an inner cable jacket 128. In certain examples, a solid conductor 120 can be used, such as copper, aluminum, etc. In other examples, a stranded conductor structure 120 is used, for example, soft annealed flexible stranded tinned copper per IEEE Std. 1580 table 11. As discussed further below, the shields 130 can be a regular conductor material designated 130c, such as copper, aluminum, etc. In other examples, the shield is a semiconductor material designated 130s, for example, meeting URL 1309, IEEE 1580 and UL 1072. In other examples, the shield structure 130 can be a multi-layer structure 130s, including an outer semiconductor layer meeting UL 1309, IEEE 1580 and UL 1072, as well as an inner conductor shield formed of a combination of semiconductor material tape and extruded thermosetting semiconductor material meeting UL 1309, IEEE 1580 and UL 1072. In certain examples, the inner cable jacket 128 is an insulating material, such as extruded thermosetting 90° C. ethylene propylene rubber (EPR) meeting UL 1309 (Type E), IEEE 1580 (Type E) and UL 1072.

In certain examples, an insulation shield is provided around the outside of the jacket 128, such as a composite shield consisting of tinned copper braided with nylon providing 60% copper shielded coverage meeting UL 1309, IEEE 1580 and UL 1072. The nylon can be colored for easy phase identification without the need to remove the shield to find an underlying colored tape, such as black, blue and red for the three phases A, B and C. The multiphase cable 106 of FIG. 2 can optionally include symmetrical insulated grounding conductors 111, for example soft annealed flexible stranded tinned copper conductors per IEEE 1580 table, with green outer Gexol insulation sized per table 23.2 of UL 1072.

Figure 3:
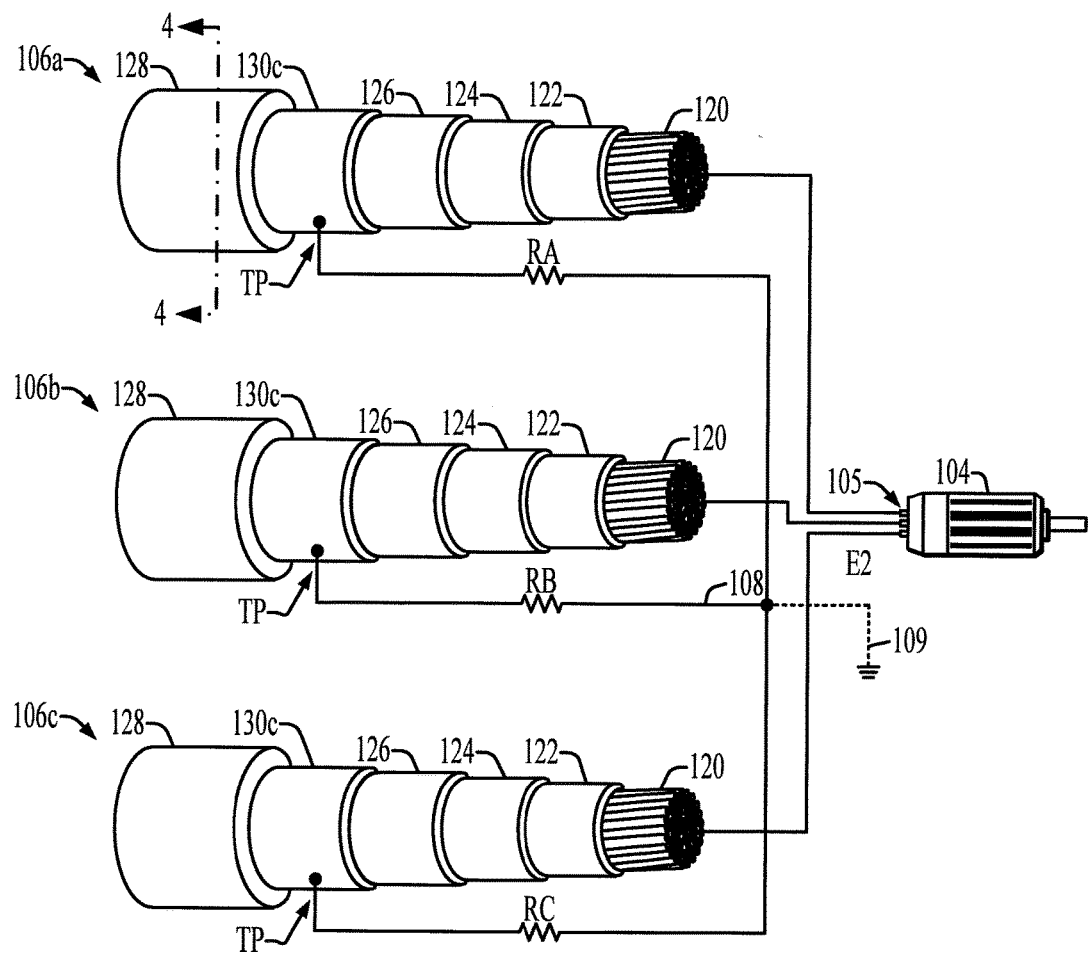
FIG. 3 is an example of cable partial perspective view.
Figure 4:
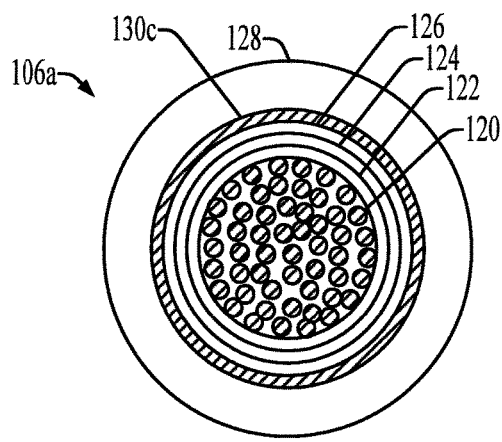
FIG. 4 is an example of cable section view.

Referring also to FIGS. 3 and 4, portions of three example phase cables are schematically illustrated in FIG. 3, which can be used as the inner cables 106a, 106b and 106c in the multiphase cable 106 of FIG. 2. The stranded conductors 120 are connected in this example to the motor lead connection terminals or points 105 of the motor load 104 by any suitable electrical connection techniques and apparatus. Each of the phase cables 106a, 106b and 106c includes a set of stranded conductors 120, a conductor shield 122, and insulation layer 124, and insulation shield 126, and a conductive metallic tape shield 130c, and the shield 130 is encapsulated by the jacket 128. As schematically illustrated in FIG. 3, the tap points TP form electrical connection to the conductive shields 130c. The tap points TP are individually connected through a corresponding one of the resistors RA, RB, RC to the conductive junction node 108. In certain examples, the node forms a neutral connection with respect to the three phase shields 130c. This junction connection 108 can be floating, or can be connected to a reference voltage (e.g., ground) 109 in certain examples. FIG. 4 illustrates a section view of a first one of the phase cables 106a taken along line 4-4 in FIG. 3, including the stranded conductors 120 that convey or provide the output signal of the motor drive to drive the motor load 104, as well as a conductive shield 130c that at least partially surrounds the corresponding conductor 120.

Figure 5:
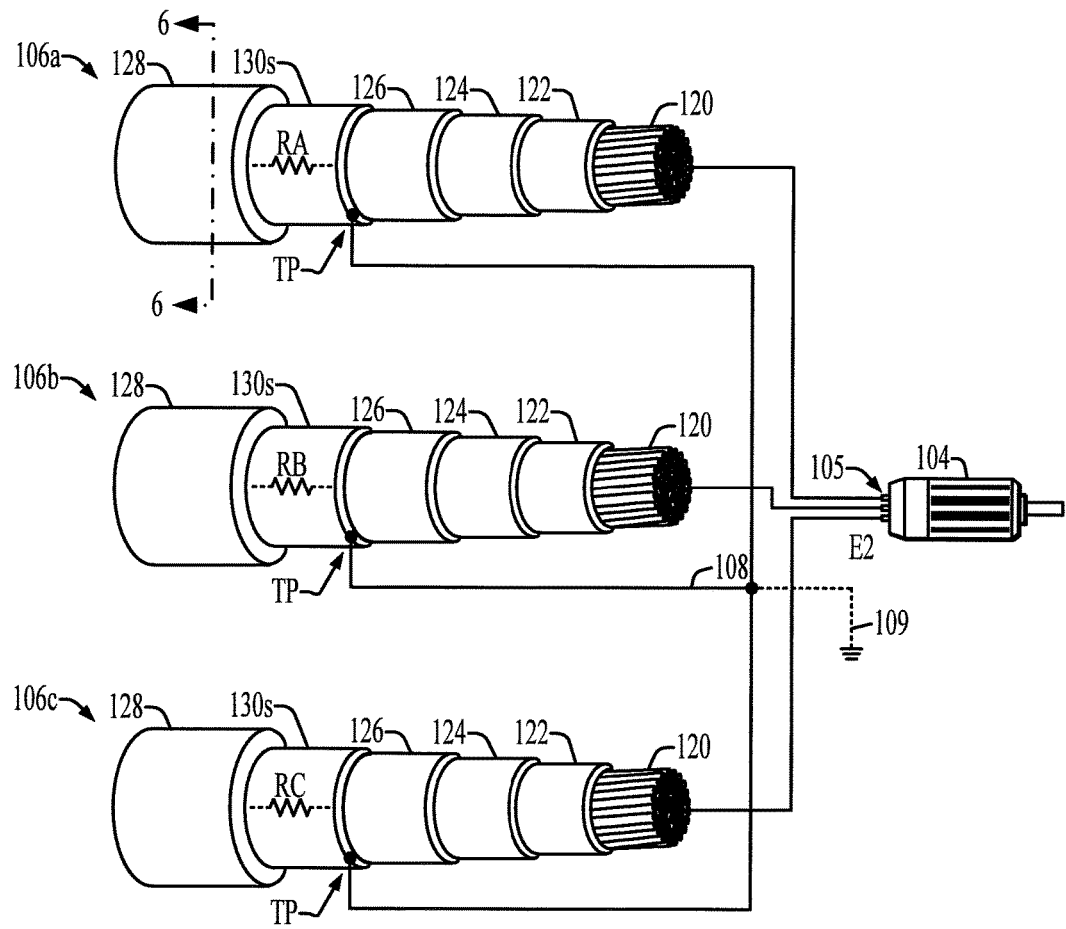
FIG. 5 is a partial perspective view.
Figure 6:
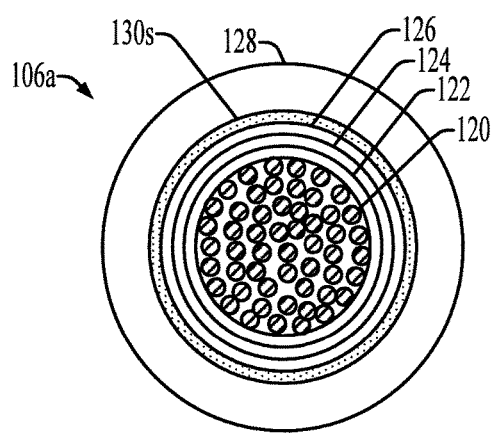
FIG. 6 is a section view.

FIGS. 5 and 6 illustrate another example, with FIG. 5 showing the three phase cables 106a, 106b and 106c with conductors 120 connected via the connection terminals 105 to deliver the motor drive output signals to the motor 104. In this example, the shields 130s include a semiconductor material to provide an impedance between the first end E1 and the conductive junction 108 to reduce voltage stress to the motor 104 and/or to reduce voltage stress to the cable 106. The shield resistances or impedances between the first end E1 and the capping points TP are schematically shown as resistances RA, RB and RC of the semiconductor shields 130s. In these examples, the shields 130 include a semiconductor material 130s to provide an impedance between the first end E1 at the motor drive inverter and the conductive junction 108 to reduce voltage stress to the motor 104 and/or the cable 106.

FIG. 6 shows a sectional view taken along line 6-6 of the first phase cable 106a in FIG. 5, including the shield material 130s including a semiconductor. In certain implementations, the multiphase cable 106 (FIG. 2) can be interconnected with the conductive junction 108 and the motor terminals 105 at the second end E2, for example, by forming solder or other electrical connections of the shields 130s to one another at the junction 108, which may, but need not be, grounded at the reference voltage 109. In certain examples, the cable 106 itself may be constructed with internal electrical connections to form a conductive junction 108 at the tap points TP between the three shields 130s to provide a floating neutral connection to mitigate voltage stress to the motor 104 and/or to the cable 106 without requiring external modification, where the conductive junction 108 is integral with the cable 106. In certain examples, such a cable can be modified to provide an electrical connection from the joined shields 130s at the conductive junction 108 to connect to a reference voltage 109.

The disclosed examples provide advantages over conventional attempts to reduce reflected waves, and provide a simple, low cost solution compared to terminating the cable supply lines at the motor terminals with a cable to motor surge impedance matching network. Moreover, the inventors have appreciated that the value of the series-connected resistance RA, RB, RC can be a fixed value for a wide range of cable lengths L, and thus the disclosed solutions provide significant universal advantages compared to designer adjustment of specific impedance matching networks used in the past. In addition, as noted in connection with FIGS. 5 and 6, the resistance or impedance provided by the semiconductor-based sheaths can be integral with the cable 106, whereby no external connections need be made at the motor end E2 of the cable 106 beyond connection of the conductors 120 to the motor terminals 105. In the examples of FIGS. 3 and 4, moreover, the provision of the external resistors RA, RB and RC can be done at a terminal block, or a junction box, or other suitable structure at or near the motor 104 (not shown). As discussed further below, the tapping points TP can be space from both the first and second ends E1, E2, and the conductive junction 108 can be formed by any suitable internal or external connections, whether integral with the multiphase cable 1064 semiconductor-based shield structures 130s, or external for semiconductor-based shield structures 130s and/or using external resistors RA, RB and RC for conductive shield structures 130c.

Figure 7:
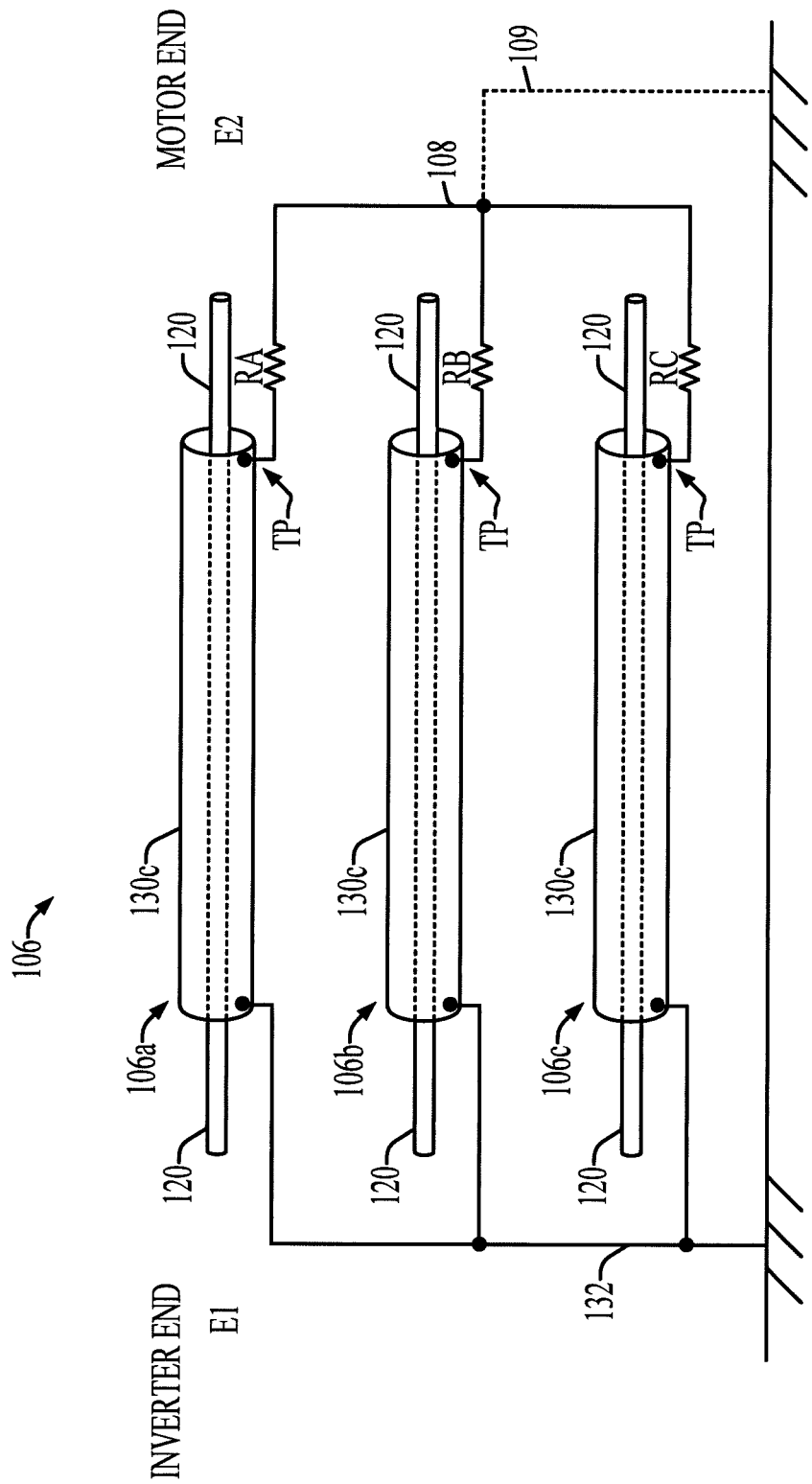
FIGS. 7-16 are schematic diagrams.

FIG. 7 illustrates an example circuit configuration of the cable 106 having conductive shield structures 130c for inner cables 106a, 106b and 106c. In this example, the first end E1 of the cable 106 is designated as being at the inverter end (e.g., directly connected to the output of the inverter 116, or indirectly coupled with the inverter output via one or more intervening circuits such as an output filter and/or a transformer). The first ends of the shields 130c in this example are connected together at a common connection point 132. The tap points TP are formed at the second end E2 (designated the motor and in the drawing), and external resistors RA, RB and RC connect the tap points TP to a conductive junction 108, which can be connected to a ground plane 109 in certain examples.

Figure 8:
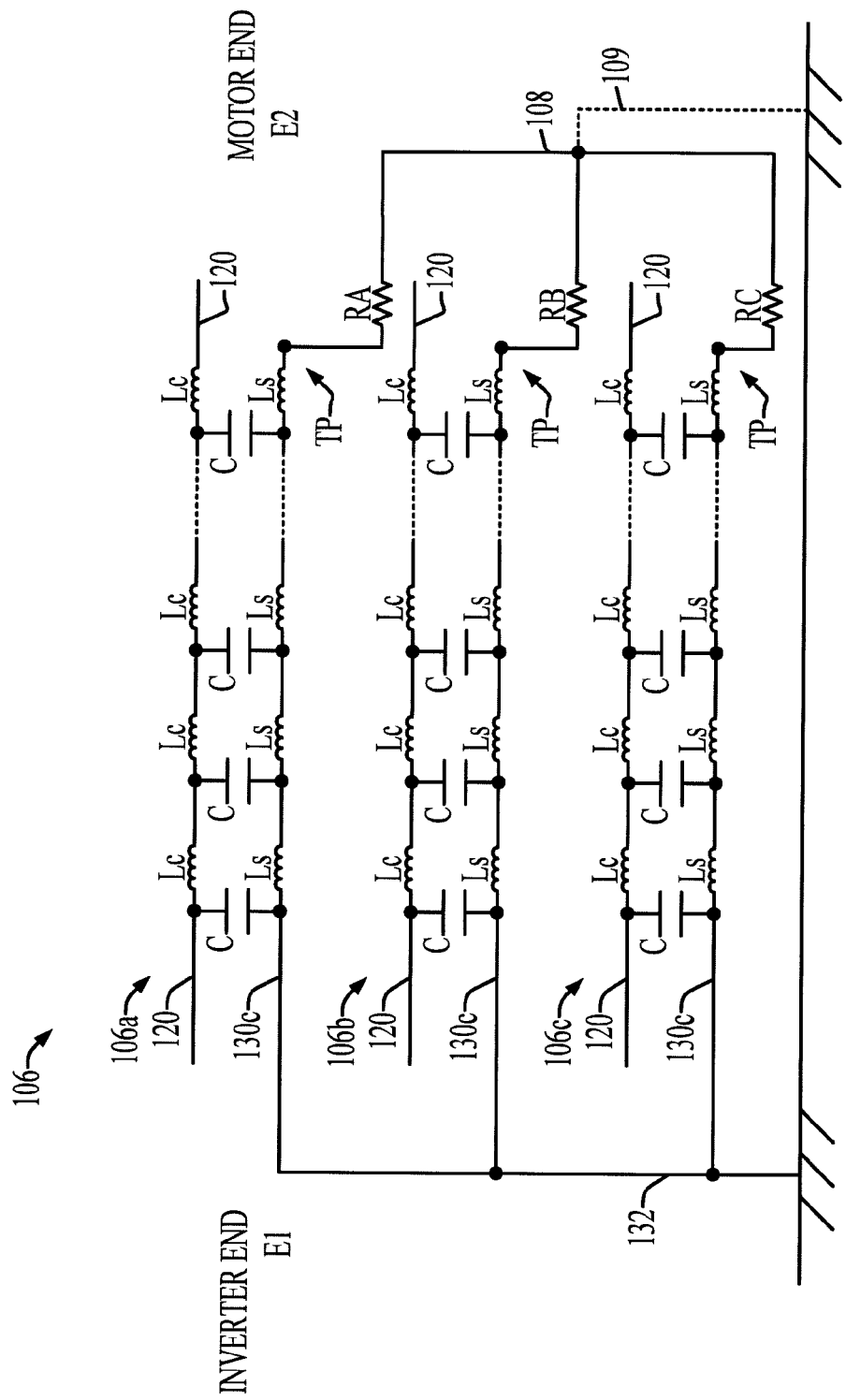

FIG. 8 illustrates an electrical circuit model of the cable system 106 between the inverter end E1 and the motor end E2. As previously discussed, the conductor structures 120 (e.g., and/or stranded) provide a conductive path to convey the inverter output signals to the motor load 104, and as shown in FIG. 8, the conductors 120 include inherent inductances Lc between the first and second ends E1 and E2. In addition, the model represents inductances associated with the shields 130c as segment inductors Ls, with conductor-to-shield capacitances indicated as segment capacitors C. The model of FIG. 8 is simplified without representing negligible capacitances between shields for different phase conductors, and without representing negligible capacitances between the shield 130c of each phase conductor and ground. As shown by the model of FIG. 8, the cable shields 130 are connected through a network at the second end E2 via the resistors RA, RB and RC, and the cable shields 130 are grounded directly at the inverter and via the connection point 132.

Figure 9:
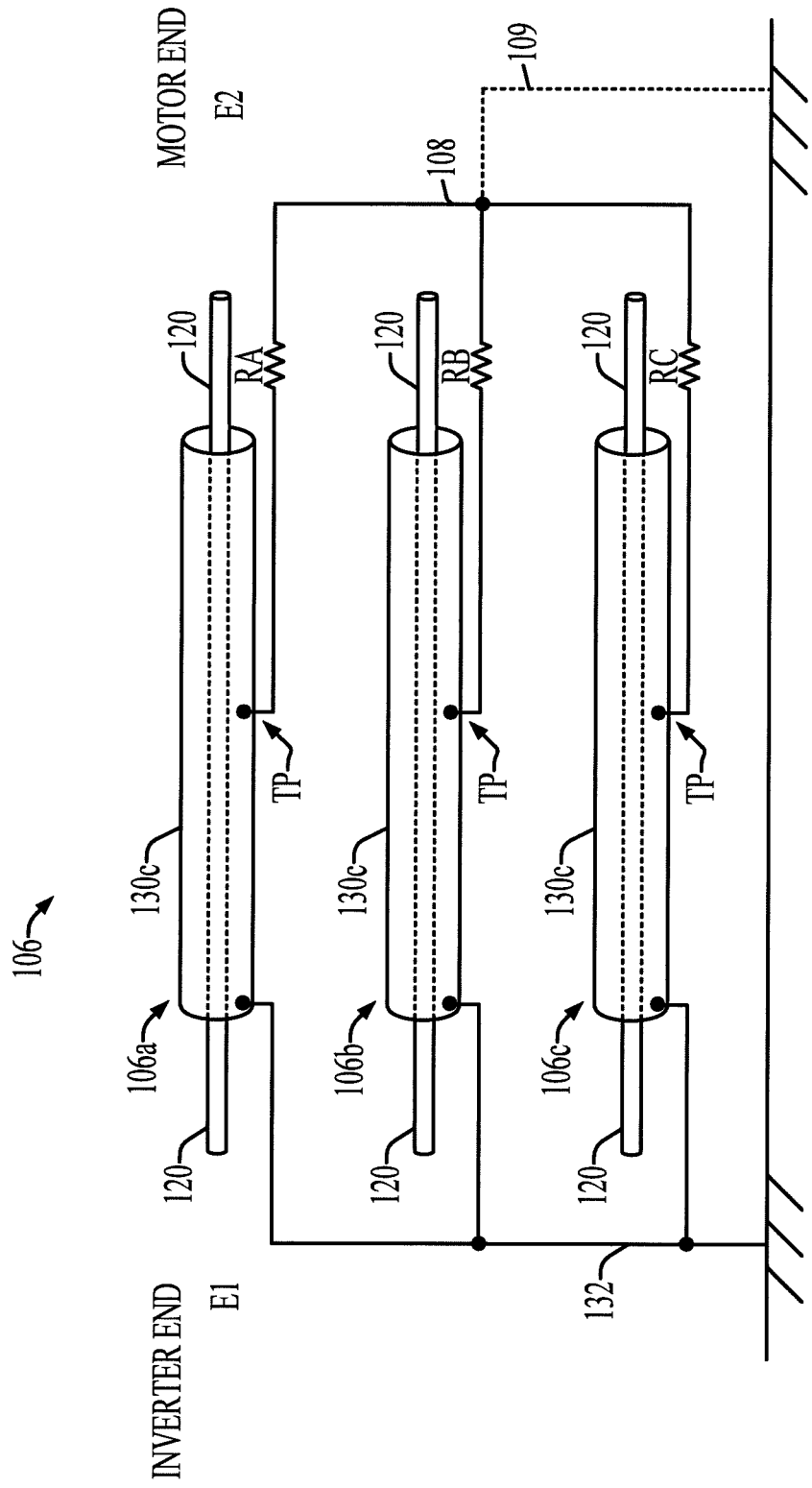
Figure 10:
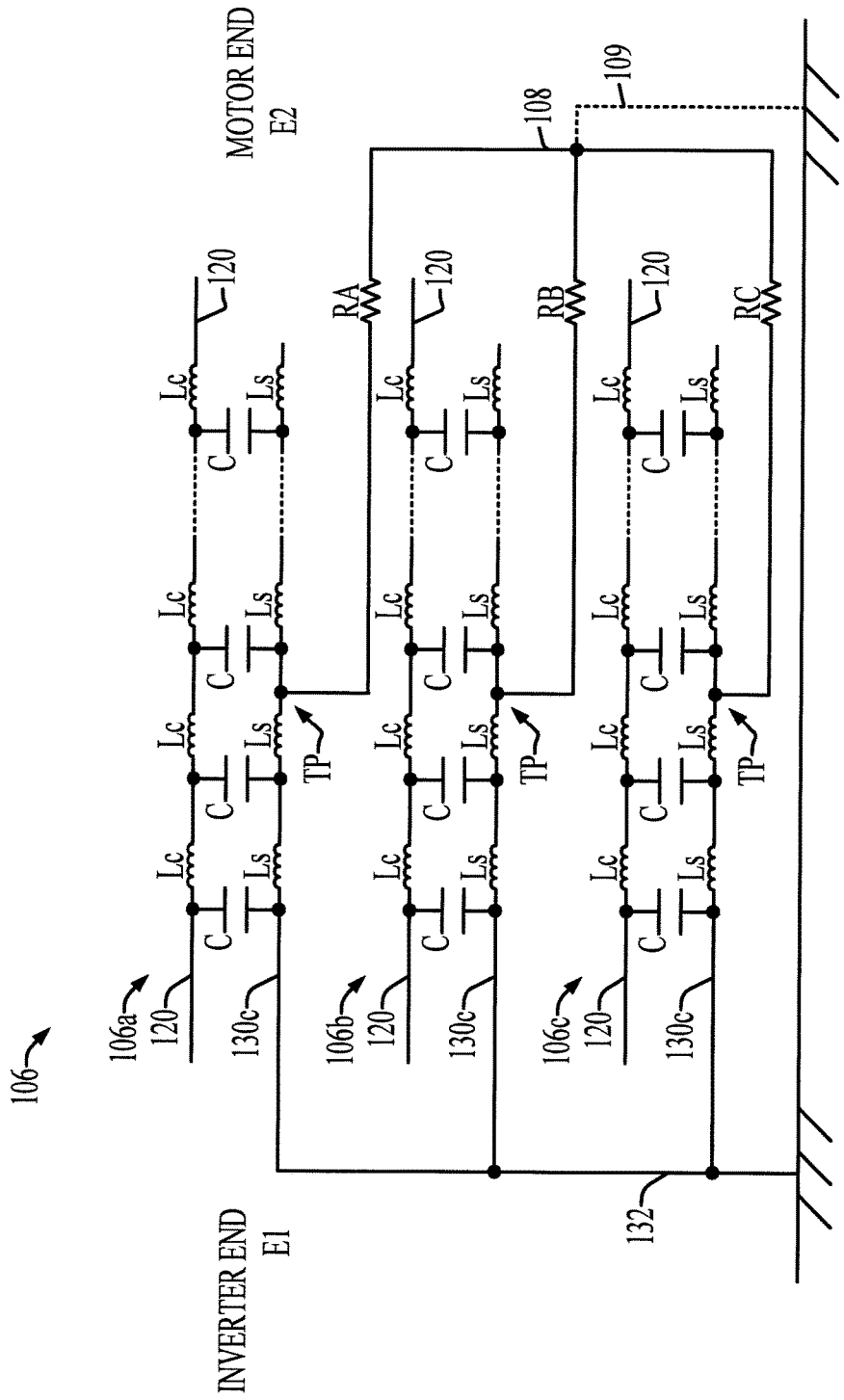

FIGS. 9 and 10 illustrate another possible configuration in which the tap points TP are located at some different location between the first and second ends E1 and E2. In this configuration, the tap points TP are spaced from the second end E2 and from the first end E1, and the corresponding resistive termination to the conductive junction 108 through the resistors RA, RB and RC forms a parallel shield circuit or network between the first end E1 and the junction 108 that includes supplemented or added resistance in order to mitigate reflected waves at the motor 104 and thereby reduce or mitigate voltage stress to the motor 104 and/or to the cable 106. As seen in FIG. 10, the termination of the shield circuit via the tap points TP and the resistors RA, RB and RC can be modeled as impedance network sections including the conductor inductances Lc, the shield inductances Ls and the conductor-shield capacitances C.

Figure 11:
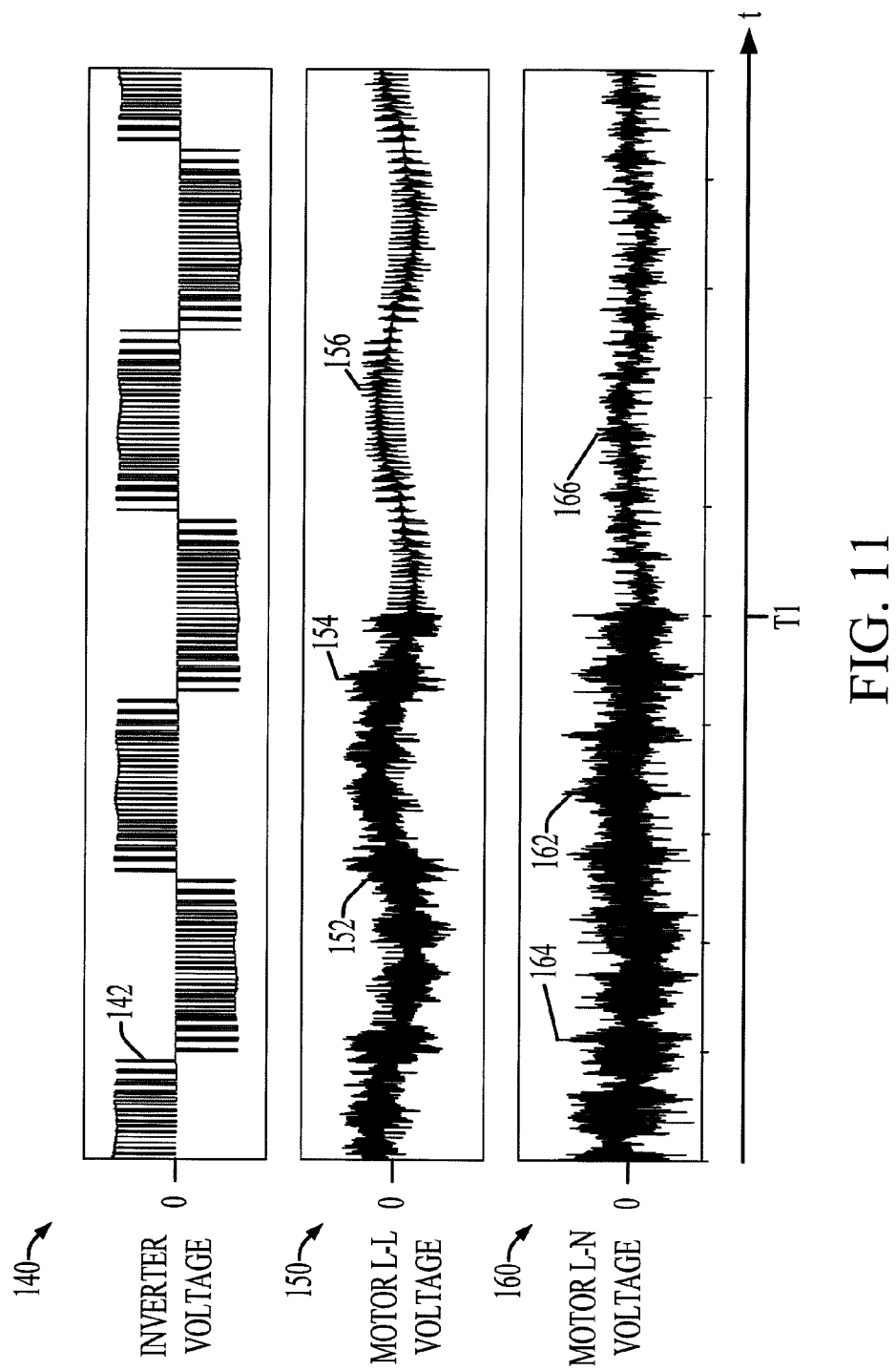
Figure 12:
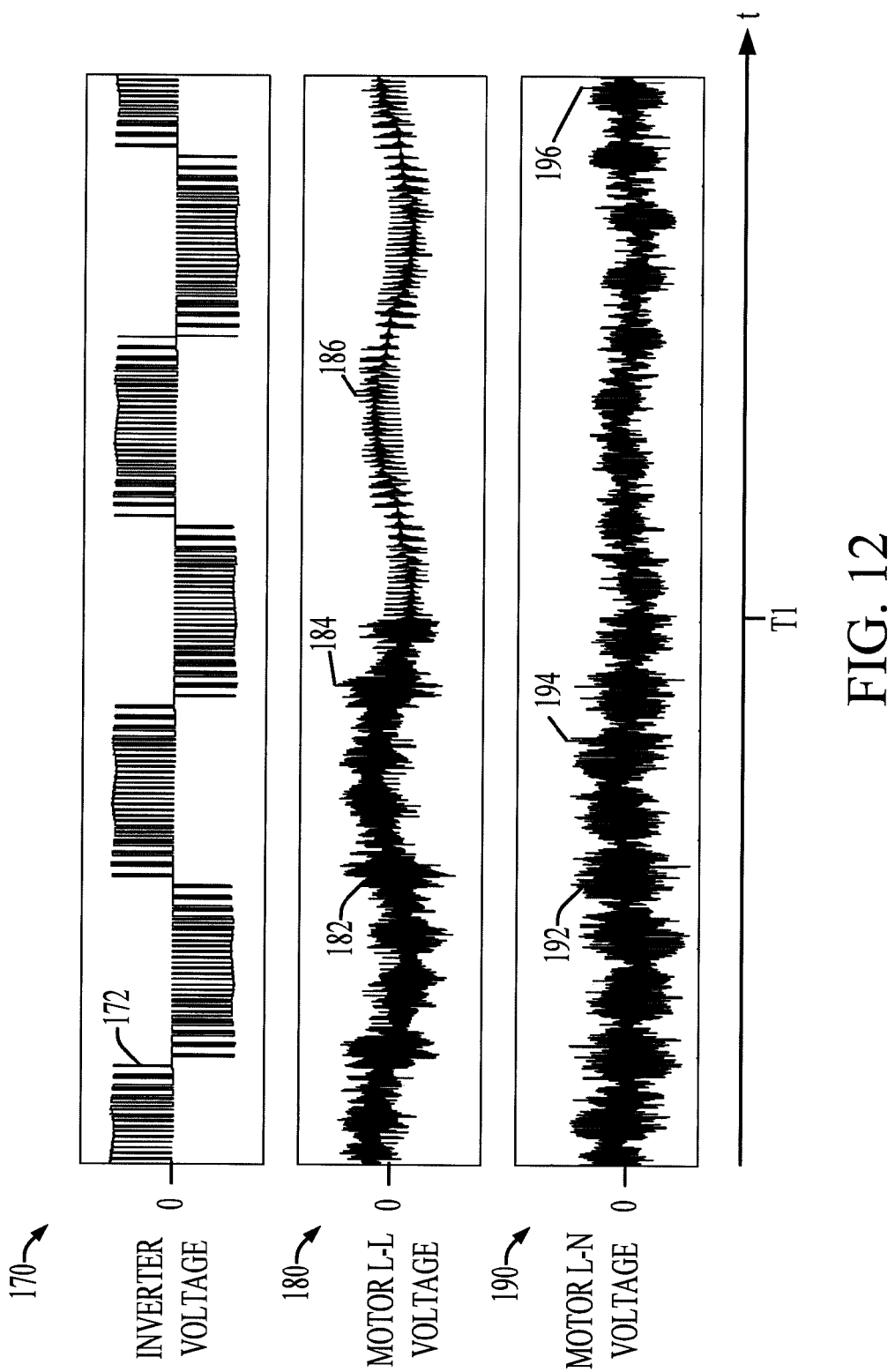

Referring now to FIGS. 11 and 12, FIG. 11 illustrates simulation waveforms 142, 152 and 162 respectively representing the inverter voltage, the motor line-line voltage and the motor line-neutral voltage for a three-phase example with the neutral formed at the conductive junction 108 grounded to the reference voltage 109. FIG. 12 illustrates simulation waveforms 172, 182 and 192 respectively representing the inverter voltage, the motor line-line voltage and the motor line-neutral voltage for a three-phase example with the neutral formed at the conductive junction 108 floating. In each of these examples, the value of the resistors RA, RB and RC is 100 ohms to provide additional resistance in the parallel shield network circuits between the first end E1 and the conductive junction 108. In the simulations, moreover, a switch is placed in parallel with each of the individual resistors RA, RB and RC until time T1, and after T1, the resistors RA, RB and RC are in the circuit. As seen in FIG. 11, the line-line voltage curve 152 is a voltage peak 154 of approximately 1260 V prior to T1, and after T1, the disclosed techniques limit the peak voltage to a peak 156 of approximately 833 V. Similarly, the line-neutral voltage curve 162 experiences a maximum peak 164 of approximately 1940 V before the resistors RA, RB and RC are in the circuit, and after T1, the highest peak 166 is reduced to 955 V. In this example, the resistor loss in each of the shield circuits is approximately 71 W with the neutral junction 108 grounded. With the neutral junction 108 floating in FIG. 12, the line-line voltage curve 182 experiences a peak 184 of approximately 1260 V prior to T1, and after T1 the highest peak 186 is reduced to 833 V. In the curve 192, the line-neutral voltage peak 194 prior to T1 is 1655 V, and the highest peak voltage 196 after T1 is reduced to 1368 V. With the neutral conductive junction 108 floating in the simulation example of FIG. 12, the resistor loss in each shield circuit is only 28 W. The simulation results in FIGS. 11 and 12 were obtained for a simulated cable length of 1200 feet, and similar results are achieved for longer cable lengths (e.g., 2400 feet using resistor values of 100 ohms. Thus, the disclosed apparatus reduces the voltage stress on the motor 104 and the cable 106 by mitigating reflected waves.

Figure 13:
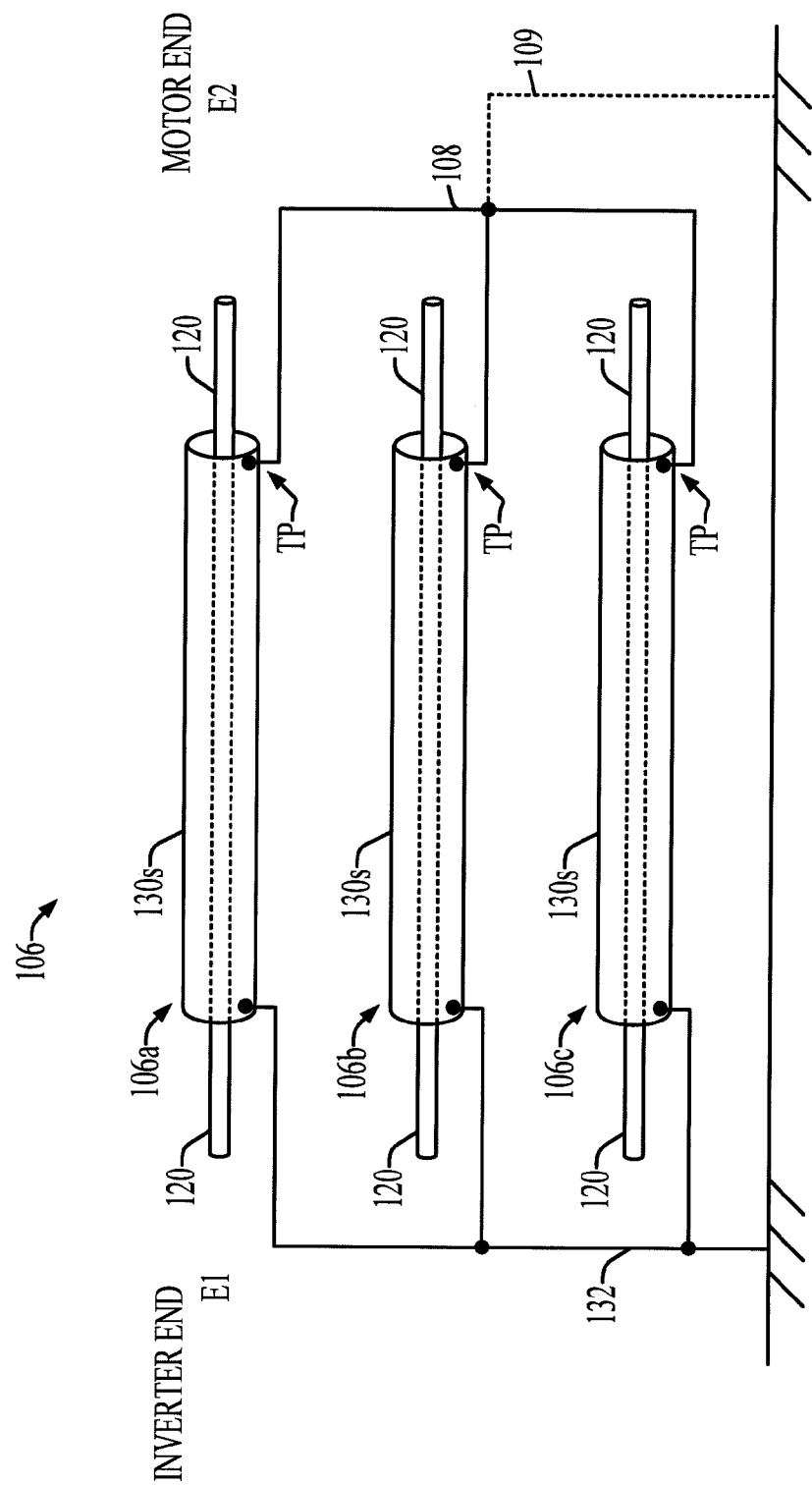
Figure 14:
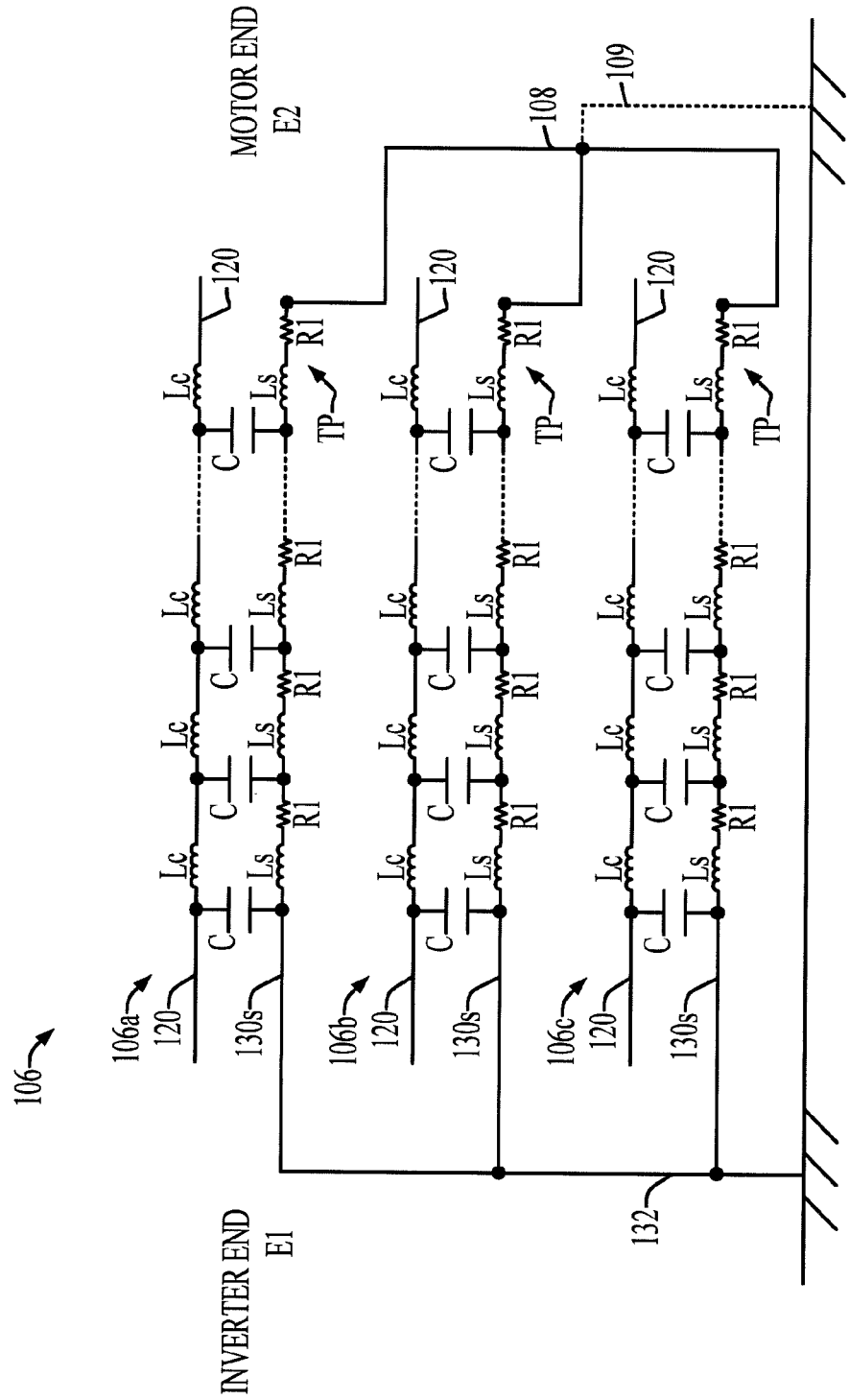
Figure 15:
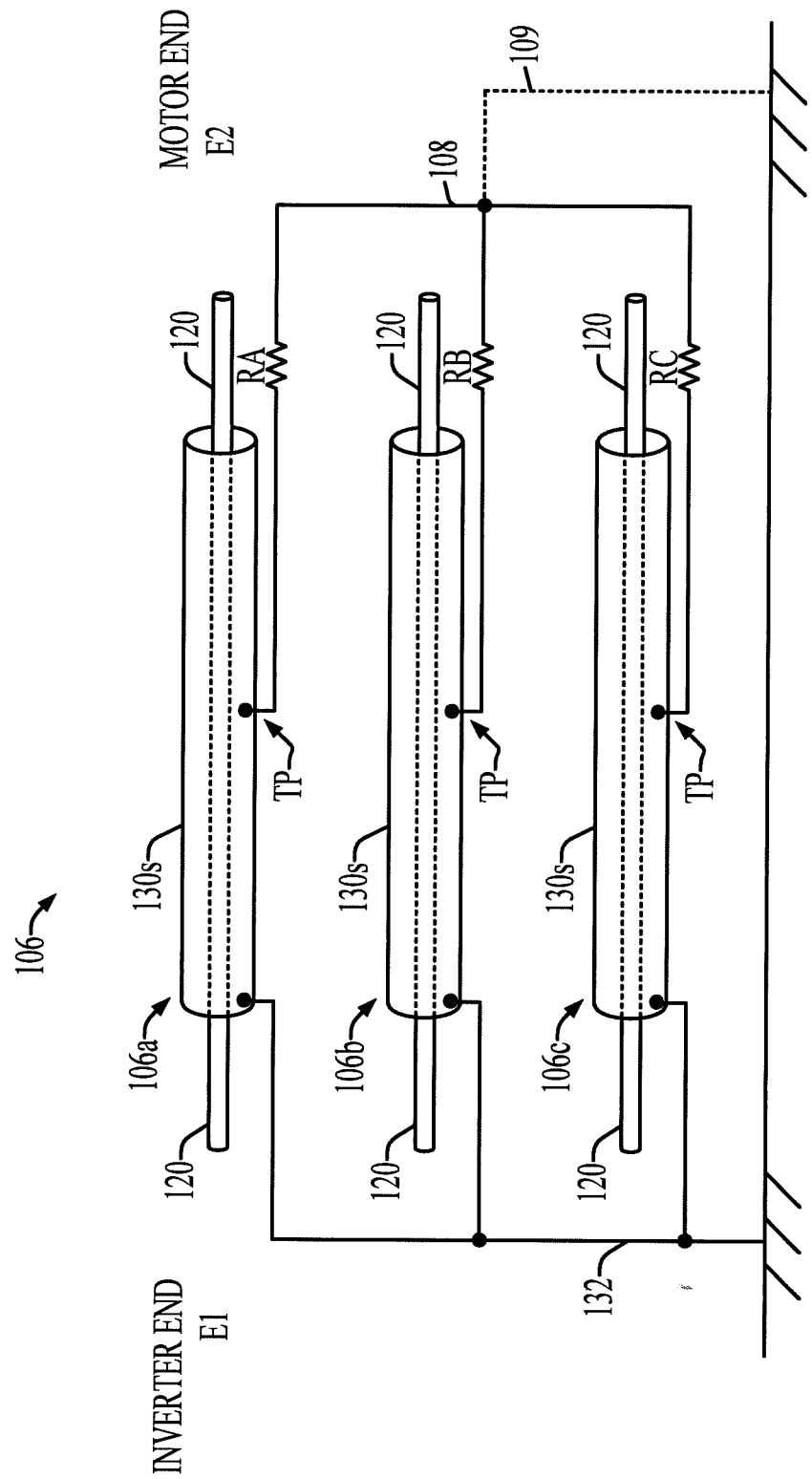
Figure 16:
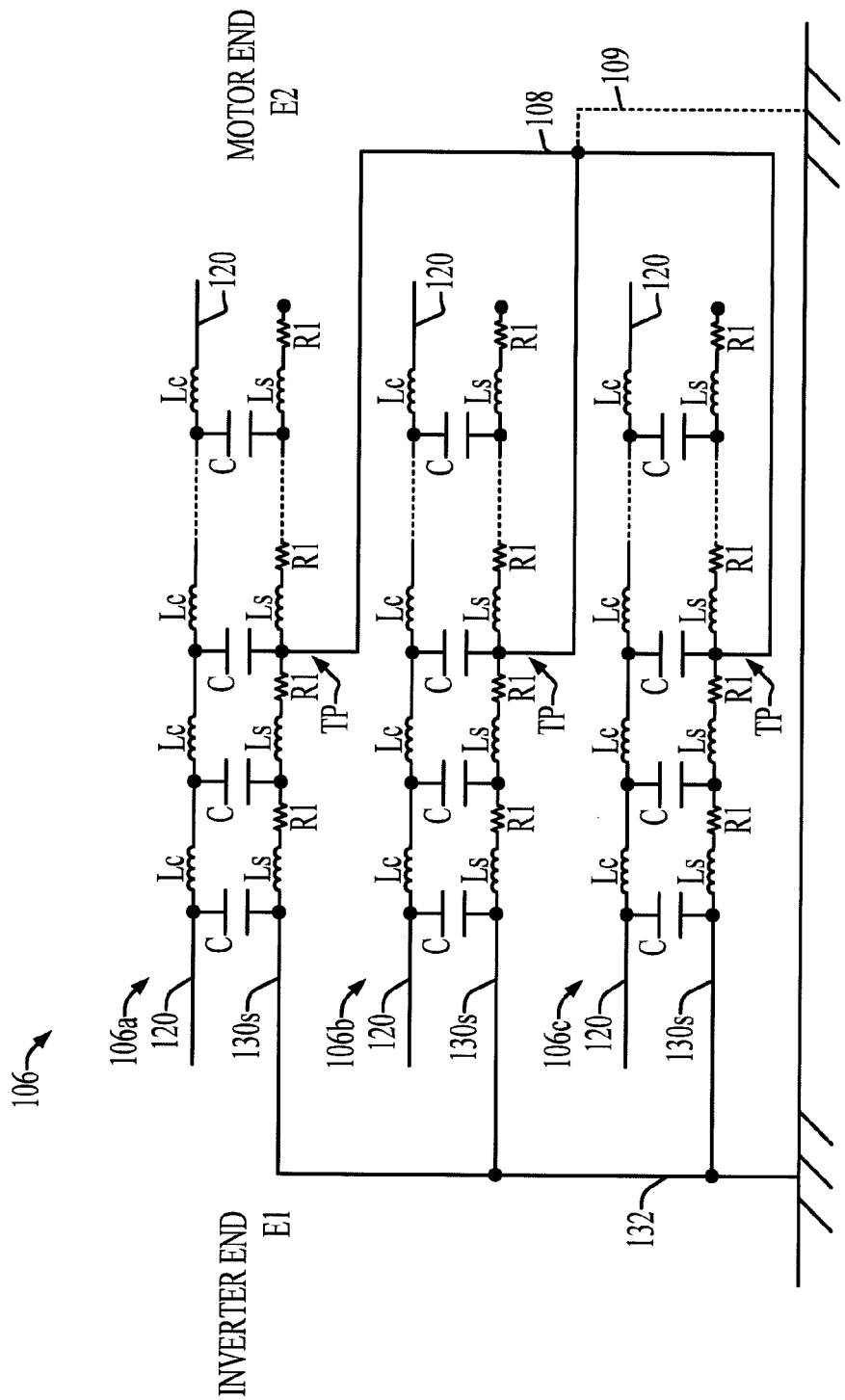

Referring now to FIGS. 13-17, in other embodiments, the cable shield material 130s includes semiconductor material to provide enhanced resistance (e.g., impedance) in the shield circuit between the first end E1 and the common connection point or conductive junction 108 proximate the tap points TP. FIG. 13 illustrates an example in which the tap points TP are proximate the second (e.g., motor) end E2. FIG. 14 shows electrical circuit model corresponding to the configuration of FIG. 13. In this case, the semiconductor material 130s used for the shields in the cable 106 are modeled along with the corresponding conductor 120 for each phase line using segment impedance components including the conductor inductance Lc, the shield inductance Ls, the conductor-shield capacitances C, and a shield segment resistance R1. As seen in the model of FIG. 14, the impedance provided by the semiconductor material in the shields 130s provides a shield circuit between the cable end E1 and the conductive junction 108 proximate the tap points TP. FIG. 15 shows a simplified connection diagram for a cable 106 using semiconductor-based shields 130s in which the tap points TP are spaced from the second end E2 as well as from E1, wherein the conductive junction 108 can be floating or can be connected to a reference voltage 109 as described above. FIG. 16 illustrates the corresponding circuit model in which the tap points TP are spaced from E2 corresponding to the configuration of FIG. 15.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, the terms "couple", "couples", or "coupled" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

The following is claimed:

1. A motor drive system, comprising:
an inverter operative to provide an output signal;
a cable coupled between an output of the inverter and a motor, the cable including a first end, a second end, a plurality of conductors to convey the output signal between the first and second ends to drive the motor, and a plurality of shields, each individual shield at least partially surrounding a corresponding one of the conductors; and
a conductive junction that electrically couples tap points of at least two of the shields together, the tap points being spaced from the first end.

2. The motor drive system of claim 1, further comprising a resistor including a first terminal connected to a given one of the tap points, and a second terminal connected to the conductive junction to provide an impedance in series with the shield between the first end and the conductive junction.

3. The motor drive system of claim 2, comprising a plurality of resistors individually corresponding to one of the plurality of shields and one of the tap points, each individual resistor including a first terminal connected to the corresponding tap point of the corresponding shield and a second terminal connected to the conductive junction to provide an impedance in series with the corresponding shield between the first end and the conductive junction.

4. The motor drive system of claim 2, wherein the tap points are proximate the second end.

5. The motor drive system of claim 2, wherein the tap points are spaced from the second end.

6. The motor drive system of claim 2, wherein the individual resistors have a resistance value close to or higher than a characteristic impedance of the cable.

7. The motor drive system of claim 1, wherein the shields include a semiconductor material to provide an impedance between the first end and the conductive junction.

8. The motor drive system of claim 7, wherein the tap points are proximate the second end.

9. The motor drive system of claim 7, wherein the tap points are spaced from the second end.

10. The motor drive system of claim 7, wherein the conductive junction is integral with the cable.

11. The motor drive system of claim 1, wherein the conductive junction is connected to a reference voltage proximate the second end.

12. A cable to couple an output of an inverter with a motor, the cable comprising:
a first end;
a second end;
a plurality of conductors to convey the output signal between the first and second ends to drive the motor;
a plurality of shields, each individual shield at least partially surrounding a corresponding one of the conductors; and
a conductive junction that electrically couples tap points of at least two of the shields together, the tap points being spaced from the first end.

13. The cable of claim 12, wherein the tap points are proximate the second end.

14. The cable of claim 12, wherein the tap points are spaced from the second end.

15. A system to couple a motor drive to a motor, comprising:
a cable, including a first end coupled with an output of a motor drive, a second end coupled with a motor, a plurality of conductors to convey an output signal of the motor drive between the first and second ends to drive the motor, and a plurality of shields, each individual shield at least partially surrounding a corresponding one of the conductors; and
a conductive junction that electrically couples tap points of at least two of the shields together, the tap points being spaced from the first end.

16. The system of claim 15, comprising a plurality of resistors, each individual resistor corresponding to one of the plurality of shields and to one of the tap points, each individual resistor including a first terminal connected to the corresponding tap point and a second terminal connected to the conductive junction to provide an impedance in series with the corresponding shield between the first end and the conductive junction.

17. The system of claim 15, wherein the shields include a semiconductor material to provide an impedance between the output of the inverter and the motor.

18. The system of claim 15, wherein the tap points are proximate the second end.

19. The system of claim 15, wherein the tap points are spaced from the second end.

20. The system of claim 15, wherein the conductive junction is integral with the cable.

\* \* \* \* \*